March 30, 1965  H. L. OLSON  3,175,483
AUTOMATIC TOASTER
Filed June 19, 1962  3 Sheets-Sheet 2
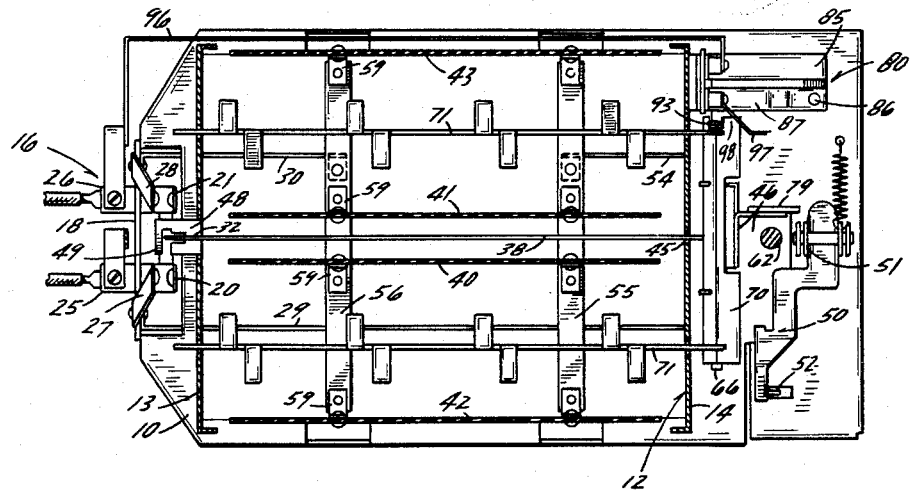
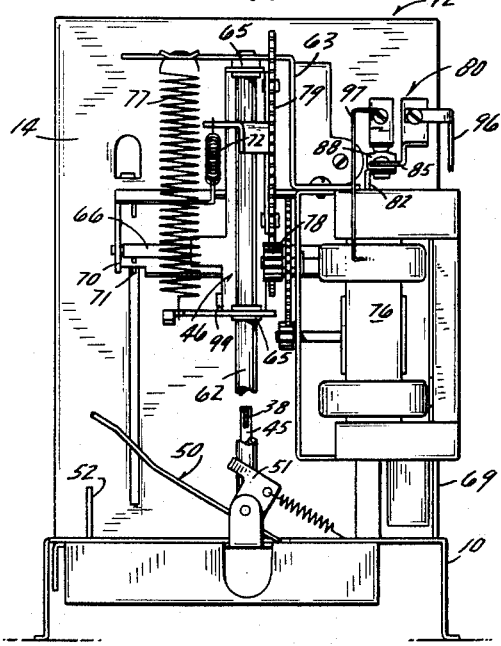
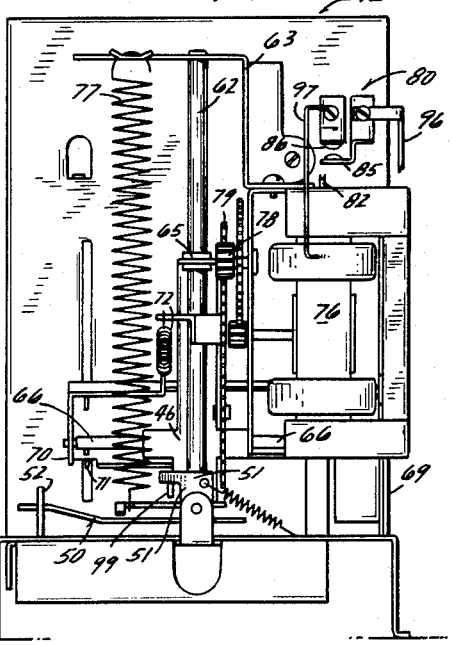
INVENTOR.
HENRY L. OLSON
BY
ATTORNEY.

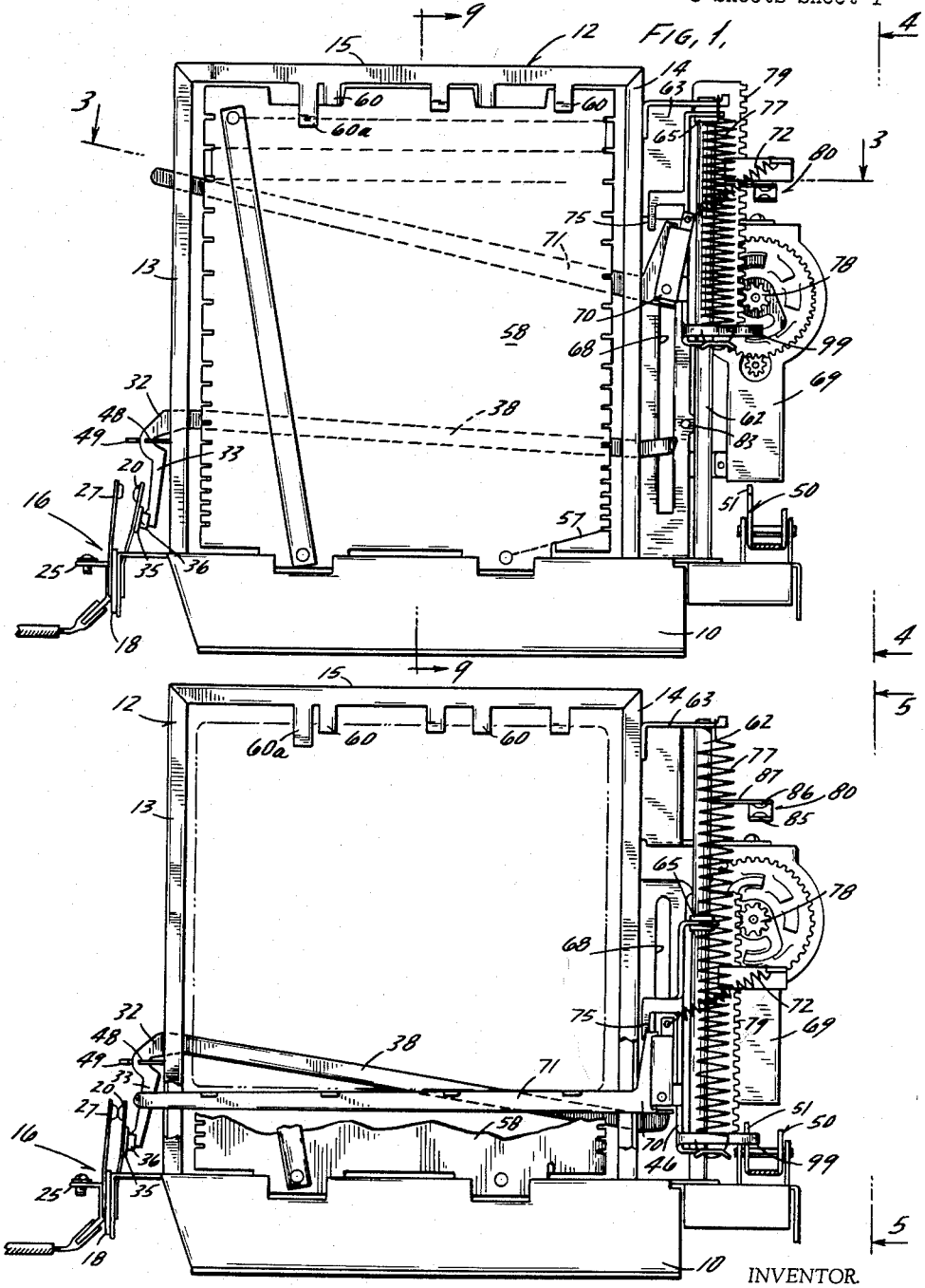

March 30, 1965   H. L. OLSON   3,175,483
AUTOMATIC TOASTER
Filed June 19, 1962   3 Sheets-Sheet 3
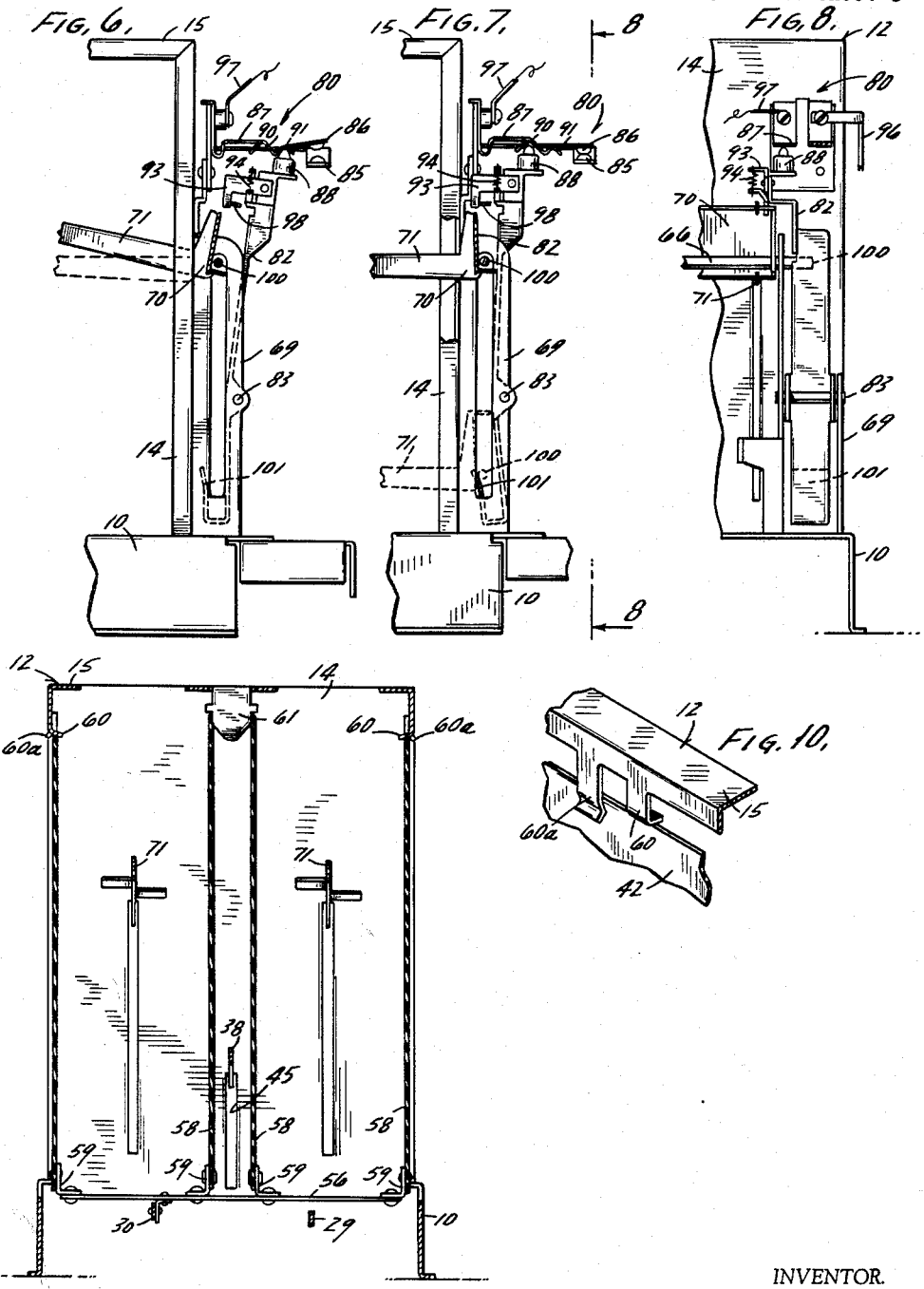
INVENTOR.
HENRY L. OLSON
BY
ATTORNEY.

United States Patent Office 3,175,483
Patented Mar. 30, 1965

3,175,483
AUTOMATIC TOASTER
Henry L. Olson, West Dundee, Ill., assignor to McGraw-Edison Company, Milwaukee, Wis., a corporation of Delaware
Filed June 19, 1962, Ser. No. 203,543
4 Claims. (Cl. 99—391)

The present invention relates to electric toasters and, more particularly, to constructional features of such toasters.

This invention is directed to a toaster design that provides a series of simplified subassemblies that may be readily interconnected to create a finished unit and possess a flexibility such that the same or very simply modified subassemblies can be used in various environments of manually actuated or bread actuated automatic toasters.

Accordingly, it is an object of this invention to provide a toasting device that is formed of a composite of improved subassemblies.

It is a further object of this invention to utilize continuous bus bars for structural support to form with the heating elements a unitary subassembly.

It is a further object of this invention to minimize current leakage from the toaster heating elements at high temperatures without the use of a supplementary insulating assembly or parts intermediate the heating elements and supporting oven portions.

It is also an object to provide a toaster wherein the heating elements are completely disconnected from the line current when not in operation.

It is also an object to provide an improved motor control mechanism for bread actuated toasters.

Other objects and advantages of the present invention will be apparent from the following description when taken in connection with the accompanying drawings wherein:

FIG. 1 is a side elevation of the toaster with the carriage in the upper or loading position;

FIG. 2 is a side elevation of the toaster, partially broken away, showing mechanism in the toasting position;

FIG. 3 is a sectional view taken along line 3—3 of FIG. 1;

FIG. 4 is an end elevation view taken along line 4—4 of FIG. 1;

FIG. 5 is an end elevation view taken along line 5—5 of FIG. 2;

FIG. 6 is a side elevation of the motor control switch in a circuit interrupting condition;

FIG. 7 is a side elevation of the motor control switch in a condition of initial actuation;

FIG. 8 is an end elevation taken along line 8—8 of FIG. 7;

FIG. 9 is a sectional view taken along line 9—9 of FIG. 1; and

FIG. 10 is a fragmentary isometric view of the contacting portions of a heating element and oven top portion.

Referring to the drawings, in FIG. 1 a main frame 10 supports thereon a single continuously formed member 12 that provides the oven end walls 13 and 14 and the slotted oven cap 15.

Adjoining the end wall 13 is a line switch assembly 16 supported on frame 10. An insulating panel 18 is secured to the frame. Mounted on the panel 18 are two pairs of cooperating, flexible contact carrying leaves, the first pair 20, 21 being connected to the line current through U-shaped brackets 25 and 26 respectively and 27, 28 which are electrically connected respectively to bus bars 29 and 30.

A bell crank 32 has one arm 33 abutting the electrically insulating member 35 (FIG. 3). The member 35 has secured thereto a guide which presents a vertical channel between a pair of inwardly extending portions 36 thereof to restrain the crank arm 33 against transverse movement. The contact carrying leaves 20, 21 are biased in the direction of the end wall 13 and serve to pivot the bell crank 32 in a counterclockwise direction to maintain it in the attitude shown in FIG. 1. The arm 38 of bell crank 32 extends through the oven between the centrally located heating elements 40 and 41, which with elements 42 and 43 and the member 12 define two toasting chambers, with the terminal end extending through a slot 45 (FIG. 9) and underlying the carriage 46. The upward pivotal action of arm 38, induced by the biasing action of resilient leaves 20, 21, is limited by abutment with the upper extremity of slot 45.

A bracket 48 is formed by stamping and bending this material from the end wall 13 of the oven. By so doing an opening in the oven end wall 13 is provided for passage of the crank arm 38, a pivot axis is established for the bell crank 32 and the bell crank is retained in position. The cantilever tab 49 which is an integral part of the bracket 48 is turned vertically upward during fabrication of the oven and after the bell crank 32 has been assembled in place the tab 49 is bent to the position shown in FIG. 1 wherein it is coplanar with the balance of the bracket 48 and prevents withdrawal of the crank arm from the bracket.

The timer of this toaster is only illustrated to the extent of showing a control lever 50 having a latching portion 51 for retaining the carriage 46 in a toasting position and a latch lever 52 for retaining the control lever 50. A complete and comprehensive description of this timer mechanism is to be found in my copending application Serial No. 203,582.

The electrical circuit supplying current to the heating elements is a series connection from the contact carrying leaf 27 (FIG. 3) through bus bar 29 to the timer mechanism and thence through bus bar 54 to the transverse element carrying bus bar 55. The current then passes in parallel through the four heating elements 40, 41, 42 and 43 to the transverse bus bar 56 and to the leaf 28 through the connecting bus bar 30.

The heating element assembly is formed by rigidly connecting the mica insulating forms 58 to the transverse bus bars 55 and 56. The riveted connecting L's 59 make the assembly of form to bus bar rigid and also provide terminals for the resistance wire 57 which is wound over the surface of each of the forms 58 which confronts the interior of a toasting chamber. This assembly is mounted in the unit with the insulating forms 58 resting in blanked openings in the main frame 10 to resist lateral or transverse movement. The upper ends of the elements are lightly contacted, to resist transverse bending and vertically upward movement, by being lightly contacted by downwardly depending tabs 60, 60a and 61 (shown in FIGS. 9 and 10). Tab 60 depends downwardly and is turned at a right angle to the element 42 to present a confronting surface that would resist upward movement of the element. Tab 60a depends downwardly and toward the element 42 with the lower end turned outwardly to establish line contact with the element when resisting movement of the element outwardly from the toasting chamber. Since the mica form can become more conductive at elevated temperatures and the upper end is subject to the highest temperatures as the heat rises, during operation, the light restraining contact afforded by the tabs 60, 60a and 61 minimizes current leakage.

The vertically movable carriage 46 adjoins the oven end wall 14 and is guided by a rod 62 which extends between the bracket 63 and the main frame 10; the carriage 46 (FIG. 4) has two vertically spaced turned portions 64 having openings therethrough with brass grommets 65 supported in the openings and journalled about the rod 62. A cross shaft 66 is journalled through another portion of the carriage 46 and extends into a slot 68 in the U-shaped motor mounting bracket 69, which bracket is rigidly secured to the end wall 14, to prevent pivotal movement of the carriage 46 about the axis of shaft 62. Also pivotally mounted on the cross shaft 66 is the toast carrier 70 which has inwardly extending toast carrying arms 71 (FIG. 3). A spring 72 biases the carrier in a clockwise direction to cause the carrier 70 to abut the carriage 46 and cause the arms 71 to assume the upwardly pivoted attitude shown in FIG. 1. When a slice of bread is inserted into the toaster the biasing force of the spring 72 is overcome and the carrier 70 pivots in a counterclockwise direction until it abuts the downwardly extending ear 75 of the carriage, at which time the arms 71 are in the generally horizontal position as shown in FIG. 2.

A motor 76 is supported by the U-shaped channel mounting bracket 69 and the bracket 63. This motor serves to lower the carriage 46 against the biasing action of spring 77 which urges the carriage toward its uppermost position. The motor acts through a gear train and overriding clutch mechanism to drive pinion gear 78 which engages a rack 79 mounted on carriage 46. This drive mechanism is shown and described more fully in United States Patent 2,895,404.

The actuation of the motor is effected by a switch 80 which is controlled by reciprocation of the carriage 46 and pivoting of the carrier 70. The contact carrying switch arm 82 is fabricated of a non-magnetic metal, in the present embodiment aluminum, to avoid any problems of vibration that may occur due to magnetic fields created in the vicinity of the motor and is pivotally mounted on the channel shaped bracket 69 about pin 83. The fixed contact 85 and the movable contact 86 carried by the resilient leaf member 87 are mounted on an electrically insulating panel which is secured to the bracket 69. A Teflon actuator 88 is carried by the switch arm 82 and is movable between the detents 90 and 91 of the resilient leaf 87 to respectively close and open the contacts. The switch arm 82 also has a pivotally connected dog 93 which may be pivoted from the position shown in FIGS. 6 and 7 against the biasing action of spring 94.

The fixed contact 85 is interconnected with the line at bracket 26 by the bus bar 96 and the wire 97 leads from the resilient leaf 87 to the motor 76.

*Operation*

When not in operation the toasting unit herein described assumes the orientation shown in FIGS. 1, 4 and 6. When a slice of bread is inserted into the toasting chamber, the carrier arm 71 is pivoted to a horizontal position causing the carrier portion indicated as 98 to engage the switch arm dog 93, pivoting the switch arm 82 and moving the actuator 88 to detent 90, as shown in FIG. 7, closing the switch 80 and actuating the motor 76. As the carriage is moved downward by the motor the lower surface of the carriage 46 contacts the crank arm 38 and by further downward travel causes the bell crank 32 to pivot, overcoming the biasing action of leaves 27, 28 to close the line switch 16 and supply current to the heating elements 40, 41, 42, 43.

At the lower end of the downward stroke of carriage 46 the control lever 50 is depressed by a portion of the carriage and is engaged and retained in a depressed position by the timer latch lever 52. Upon termination of motor actuation the carirage is retained in the lowered position by engagement between the control lever latching portion 51 and the carriage tab 99.

The actuation of the motor 76 is terminated at the lower end of the downward stroke of the carriage 46 as the distal end 100, in FIG. 7, of the cross shaft 66, acting as a cam follower strikes the cam surface 101 of the lower hook portion of the switch arm 82. The cross shaft end forces the switch arm 82 to the position shown in FIG. 6 wherein the actuator 88 is returned to the detent 91 to open the switch 80 and terminate operation of motor 76.

When the timer causes the latch lever 52 to release the control lever 50 at the end of the toasting cycle, the spring 77 returns the carriage to its upper position shown in FIG. 1 and thereby also terminates the restraint exercised with respect to bell crank 32 to allow the biasing action of leaves 20, 21 to open the line switch and terminate the power supply to the heating elements.

When the carriage 46 reaches its upper position the toast is normally still resting on the carrier arms 71 maintaining them in the horizontal position against the biasing action of spring 72. As the carriage reaches the top of the upward stroke with the carrier 70 supporting the toast, the carrier portion 98 abuts the downward facing surface of the dog 93 and pivots it against the biasing action of spring 94. When the toast is removed, the carrier is pivoted clockwise to the position shown in FIG. 6 by the biasing action of spring 72 (FIGS. 2, 4) whereby the carrier portion 98 pivots behind the downwardly depending ear of the dog 93 to prepare the unit to recycle upon the next insertion of a slice of bread into the toasting chamber.

Although but one embodiment has been shown and described, it will be apparent to those skilled in the art that various changes and modifications may be made therein without departing from the spirit of the invention or from the scope of the appended claims.

I claim:

1. An automatic toaster comprising a carriage having an upper loading position and a lower toasting position, electromotive means for moving said carriage from said loading position to said toasting position; a stationary bracket presenting a slotted flange portion in confronting relation to said carriage; a switch assembly for actuating said electromotive means having a vertically extending actuating member pivotally connected to said bracket about a horizontal axis and a pair of electrical contacts including a movable contact carrying leaf engaging said actuating member at contact opening and contact closing detent positions formed in said leaf, said actuating member being pivotable between first and second leaf engaging positions for respectively opening and closing said contacts, a transversely extending portion of said carriage projecting through said slotted opening to engage and pivot said actuating member to said first position as said carriage approaches its lowermost position and a bread actuted member mounted on said carriage and engagable with said actuating member when said carriage is in said loading position to pivot said actuating member to said second position.

2. The automatic toaster of claim 1 wherein said actuating member is formed of a non-magnetic material.

3. An automatic toaster comprising a carriage vertically movable between a raised loading position and a lowered toasting position; electromotive means for moving said carriage from said upper to said lower position; switch means for selectively energizing said electromotive means, said switch including a contact carrying member having first and second detents formed therein; a stationary bracket; a vertically extending actuating member pivotally connected to said bracket about a horizontal axis and engaging said switch means, said actuating member being pivotable between a switch opening position in engagement with said first detent and a switch closing position in engagement with said second detent; a transversely extending member mounted on said carriage and engageable with said actuating member when said carriage approaches its lowermost position to pivot said actuating member to said switch opening position, and bread actuated means mounted on said carriage selectively operable to move said actuating member to a switch closing position when said carriage is in said raised position.

4. An automatic toaster comprising a vertically extending rod; a carriage assembly journaled about said rod for vertical sliding movement with respect thereto; a vertically extending stationary bracket adjoining said carriage having a vertically extending flange portion with a slotted opening therein confronting said carriage; a transversely projecting member mounted on said carriage and extending through said slotted opening; a vertically extending actuating lever pivotally connected to said bracket about a horizontal axis; electromotive means for moving said carriage from an upper loading position to a lowered toasting position; a switch for energizing said electromotive means including a contact carrying leaf member biased to a normally closed position having a contact opening first detent position and a contact closing second detent position formed therein engaged by said actuating lever when said lever is disposed respectively in first and second positions; and bread actuated means mounted on said carriage operable to engage and move said actuating lever to said lever second position, said lever presenting a camming surface adjacent said sloted opening and operable to engage said transversely extending member and pivot said actuating lever to said lever first position as said carriage approaches the lowermost position of vertical sliding movement.

References Cited by the Examiner
UNITED STATES PATENTS

| | | | |
|---|---|---|---|
| 2,193,972 | 3/40 | Lavenburg | 99—327 |
| 2,288,699 | 7/42 | Gomersall et al. | |
| 2,598,592 | 5/52 | Olson et al. | 99—389 |
| 2,620,426 | 12/52 | Gustofson | 99—389 |
| 2,622,505 | 12/52 | Olson et al. | 99—391 |
| 2,667,828 | 2/54 | Koci. | |
| 2,693,142 | 11/54 | Ireland. | |
| 2,895,404 | 7/59 | Ireland. | |
| 2,969,010 | 1/61 | Andrews et al. | 99—329 |
| 3,035,509 | 5/62 | Lawser | 99—329 |

ROBERT E. PULFREY, *Primary Examiner.*

NORTON ANSHER, LAWRENCE CHARLES, JEROME SCHNALL, *Examiners.*